(12) United States Patent
Auf der Springe

(10) Patent No.: US 10,073,879 B2
(45) Date of Patent: Sep. 11, 2018

(54) SYSTEM AND METHOD FOR PREVENTING CORRUPTION OF VEHICLE HISTORY DATA FILES

(71) Applicant: HONEYWELL INTERNATIONAL INC., Morris Plains, NJ (US)

(72) Inventor: Freddy Richard Auf der Springe, Bothell, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 166 days.

(21) Appl. No.: 15/064,768

(22) Filed: Mar. 9, 2016

(65) Prior Publication Data
US 2017/0262488 A1 Sep. 14, 2017

(51) Int. Cl.
| | |
|---|---|
| B64D 45/00 | (2006.01) |
| C07C 5/08 | (2006.01) |
| G01C 23/00 | (2006.01) |
| G08G 1/16 | (2006.01) |
| G06F 17/30 | (2006.01) |

(Continued)

(52) U.S. Cl.
CPC ....... G06F 17/30371 (2013.01); G01C 23/00 (2013.01); G06F 17/30241 (2013.01); G07C 5/085 (2013.01); G07C 5/0841 (2013.01); G08G 1/16 (2013.01); G08G 5/04 (2013.01);

(Continued)

(58) Field of Classification Search
CPC ...................... B64D 2045/0065; G01P 13/025
See application file for complete search history.

(56) References Cited

U.S. PATENT DOCUMENTS

2002/0097169 A1 7/2002 Johnson et al.
2014/0082406 A1 3/2014 Erez
(Continued)

FOREIGN PATENT DOCUMENTS

DE 102013021500 A1 6/2015
EP 1218220 A1 7/2002
(Continued)

OTHER PUBLICATIONS

Leddy, C.; Avoid Corruption in Nonvolatile Memory, Embedded.com, 2003.
(Continued)

Primary Examiner — Charles J Han
(74) Attorney, Agent, or Firm — Lorenz & Kopf, LLP

(57) ABSTRACT

A system for a vehicle includes a non-volatile memory device, a database, a plurality of vehicle data sources, and a processor. The database has data stored therein that are representative of at least terrain or man-made obstacles the vehicle may potentially impact. Each vehicle data source is configured to supply vehicle parameter data that are representative of a vehicle parameter. The processor is coupled to acquire data from the database and to receive the vehicle parameter data and is configured to store at least selected portions of the vehicle parameter data and internally processed parameters in a history data file in the non-volatile memory device. The processor is also configured to determine if the vehicle will impact terrain or a man-made obstacle within a predetermined time, and stop storing data in the history data file upon determining that the vehicle will experience an impact within the predetermined time.

11 Claims, 2 Drawing Sheets

(51) Int. Cl.
   *G07C 5/08*      (2006.01)
   *G08G 5/04*      (2006.01)
(52) U.S. Cl.
   CPC ............. *B64D 2045/0065* (2013.01); *B64D 2700/62289* (2013.01)

(56) References Cited

U.S. PATENT DOCUMENTS

| | | | |
|---|---|---|---|
| 2015/0073664 A1 | 3/2015 | Petridis et al. | |
| 2016/0075444 A1* | 3/2016 | Girod | B64D 45/00 |
| | | | 701/45 |
| 2016/0257415 A1* | 9/2016 | Ye | B64D 3/00 |
| 2017/0082455 A1* | 3/2017 | Adler | B64D 45/00 |
| 2017/0200330 A1* | 7/2017 | Gupta | G07C 5/085 |

FOREIGN PATENT DOCUMENTS

| | | |
|---|---|---|
| JP | 2002127997 A | 5/2002 |
| JP | 2015038688 A | 2/2015 |

OTHER PUBLICATIONS

Extended EP Search Report for Application No. 17154283.0-1557 dated Jul. 18, 2017.

* cited by examiner

US 10,073,879 B2

SYSTEM AND METHOD FOR PREVENTING CORRUPTION OF VEHICLE HISTORY DATA FILES

TECHNICAL FIELD

The present invention generally relates to vehicle history data, and more particularly relates to a system and method for preventing the corruption of vehicle history data files.

BACKGROUND

Many aircraft are now equipped with a terrain awareness and warning system (TAWS), which is also, at times, referred to as an enhanced ground proximity warning system (EGPWS). The EGPWS, in addition to detecting and providing warnings regarding potential controlled flight into terrain (CFIT) incidents, stores various flight parameter data in a flight history file in a non-volatile memory device. These flight parameters may be used to debrief an incident.

In some systems, if power to the EGPWS is interrupted while flight parameter data are being written to the flight history file, the flight history file can be corrupted. Thus, should a power loss occur during, or near the end, of an incident, it may not be possible to decipher the events leading up to the incident.

Hence, there is a need for a system and method of preventing flight history file corruption in the highly unlikely, yet postulated event of an incident that causes power to the EGPWS to be lost. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for a vehicle includes a non-volatile memory device, a database, a plurality of vehicle data sources, and a processor. The non-volatile memory device is configured to receive and store vehicle history data in a history data file. The database has data stored therein relevant to operation of the vehicle. The data are representative of at least terrain or man-made obstacles the vehicle may potentially impact. Each vehicle data source is configured to supply vehicle parameter data that are representative of a vehicle parameter. The processor is in operable communication with the non-volatile memory device, the database, and the plurality of vehicle data sources. The processor is coupled to acquire data from the database and to receive the vehicle parameter data and is configured, upon receipt thereof, to: store at least selected portions of the vehicle parameter data and data representing internally processed parameters in the history data file, determine if the vehicle will impact terrain or a man-made obstacle within a predetermined time, and stop storing data in the history data file upon determining that the vehicle will experience an impact within the predetermined time.

In another embodiment, a method for storing vehicle history data includes, in a processor, retrieving data from a database and receiving vehicle parameter data, where the data from the database are representative of at least terrain and man-made obstacles the vehicle may potentially impact, and the vehicle parameter data are representative of vehicle parameters. At least a portion of the vehicle parameter data and data representing internally processed parameters are stored in a vehicle history data file in a non-volatile memory device. The terrain and man-made obstacle data and the vehicle parameter data are processed, in the processor, to determine if the vehicle will experience an impact within a predetermined time, and the storage of data in the history data file is stopped upon determining that the vehicle will experience an impact within the predetermined time.

In yet another embodiment, a system for an aircraft includes a plurality of aircraft data sources and an enhanced ground proximity warning system. Each aircraft data source is configured to supply aircraft parameter data that are representative of an aircraft parameter. The enhanced ground proximity warning system is in operable communication with the plurality of aircraft data sources, and includes a non-volatile memory device, a terrain database, and a processor. The non-volatile memory device is configured to receive and store aircraft history data in a flight history data file. The terrain database has data stored therein that are at least representative of terrain, man-made obstacles, and airports. The processor is in operable communication with the non-volatile memory device, the terrain database, and the plurality of aircraft data sources. The processor is coupled to acquire data from the terrain database and to receive the aircraft parameter data and is configured, upon receipt thereof, to: store at least selected portions of the vehicle parameter data and data representing internally processed parameters in the flight history data file, determine if the aircraft will impact terrain or a man-made obstacle within a predetermined time, and stop storing the aircraft parameter data in the flight history data file upon determining that the aircraft will experience an impact within the predetermined time.

Furthermore, other desirable features and characteristics of the vehicle history data file corruption prevention system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, although the embodiments described herein are preferably implemented in an aircraft, the embodiments may be implemented in various other types of vehicles including, but not limited to, automobiles, locomotives, watercraft, spacecraft, and various other types of terrestrial and non-terrestrial vehicles.

Figure 1:
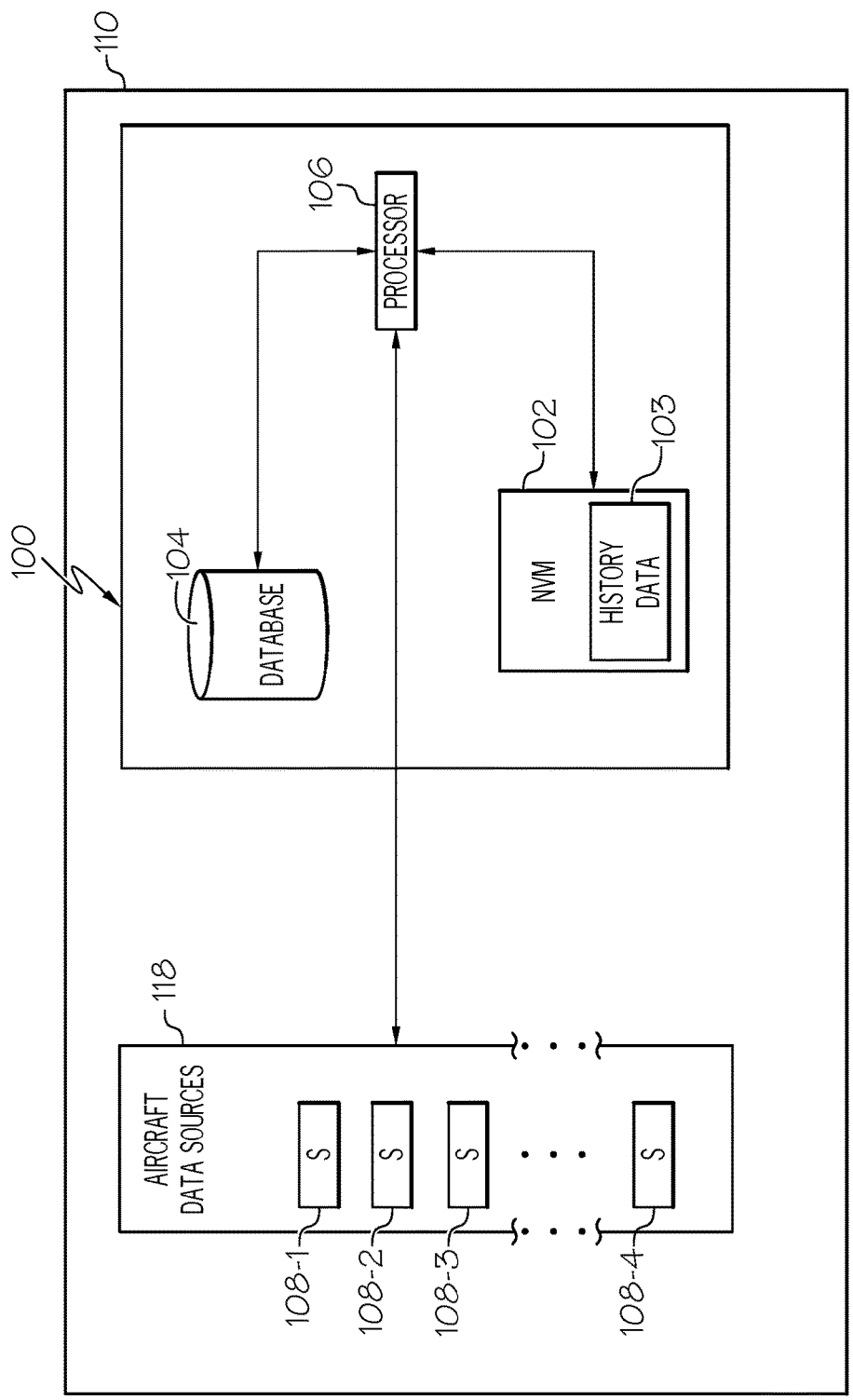
FIG. 1 depicts a functional block diagram of one embodiment of a data storage system for a vehicle, such as an aircraft.

Turning now to FIG. 1, a functional block diagram of one embodiment of a vehicle data processing system 100 is depicted. The system 100 includes a non-volatile memory device 102, a database 104, and a processor 106, and is in operable communication with a plurality of aircraft data sources 108 (108-1, 108-2, 108-3 . . . 108-N). All of these components, at least in the depicted embodiment, are disposed on or within a vehicle 110. As noted above, the vehicle 110 may be anyone of numerous types of terrestrial and non-terrestrial vehicles such as, for example, an automobile, a locomotive, a watercraft, or a spacecraft. In one particular embodiment, however, the vehicle 110 is an aircraft.

Regardless of the vehicle type, the non-volatile memory device 102 is configured to receive and store vehicle history data. In particular, the received vehicle history data are stored in a history data file 103 within the non-volatile memory device 102. It will be appreciated that the non-volatile memory device 102 may be variously implemented. For example, it may be implemented using any one of numerous types of read-only memory, flash memory, a magnetic storage device, or an optical storage device, just to name a few. It will additionally be appreciated that the non-volatile memory device 102 may be implemented separate from the vehicle data processing system 100, if needed or desired.

The database 104 has data stored therein relevant to the operation of vehicle 110. As may be appreciated, the data in database 104 are at least data representative of terrain or man-made obstacles that the vehicle 110 may potentially impact. Such data may vary depending upon the vehicle 110. For example, when the vehicle 110 is an aircraft, the database 104 is preferably any one of numerous known terrain databases, and the data in the database are representative of at least terrain, man-made obstacles, and airports. Although the database 104 is depicted in FIG. 1 as being implemented as part of the vehicle processing system 100, it will be appreciated that in some embodiments the database 104 may be implemented separate from the vehicle processing system 100.

Before describing the processor 106, it is noted that the vehicle data sources 108 are each configured to supply vehicle parameter data representative of a vehicle parameter. Although the vehicle data sources 108 are, for clarity, depicted in FIG. 1 using functional blocks, it will be appreciated that the number and type of vehicle data sources 108 may vary. For example, the vehicle data sources 108, in some embodiments, are implemented using a plurality of vehicle sensors, each of which is configured to sense one or more different vehicle parameters and supply sensor data representative thereof. It will additionally be appreciated that the number and type of vehicle parameters may vary depending, for example, on the type of vehicle 110. In the embodiment in which the vehicle 110 is an aircraft, the vehicle parameters may include at least ground speed, vertical speed, altitude, track, latitude, and longitude.

The processor 106 is in operable communication with the non-volatile memory device 102 and the database 104, and the plurality of vehicle data sources 108. In the depicted embodiment the processor 106 is in operable communication with the non-volatile memory device 102, the database 104, and the plurality of vehicle data sources 108 via wired communication interfaces. It will be appreciated, however, that operable communication between the processor 106 and one or more of the non-volatile memory device 102, the database 104, and the plurality of vehicle data sources 108 could be implemented wirelessly. It will additionally be appreciated that the processor 106 may be implemented as part of any one of numerous systems in the vehicle 110. For embodiments in which the vehicle 110 is an aircraft, the processor 106 is implemented in the enhanced ground proximity warning system (EGPWS).

Figure 2:
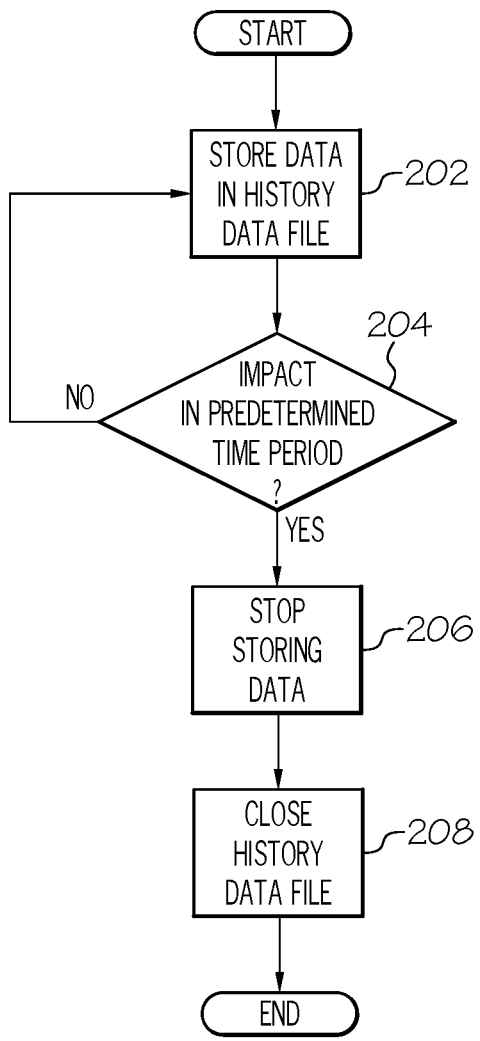
FIG. 2 depicts an embodiment of a process, in flowchart form, that may be implemented in the system of FIG. 1.

The processor 106 is configured to acquire relevant data from the database 104 and to receive vehicle parameter data from the vehicle data sources 108. The processor 106 stores at least selected portions of the vehicle parameter data and data representing internally processed parameters in the history data file 103 in the non-volatile memory device 102. The stored data may be retrieved and used, for example, to debrief an incident. That is, to decipher the events leading up to the incident. As FIG. 2 depicts, the processor 106 is configured to implement various additional functions. With reference to FIG. 2, these additional functions will now be described.

In addition to storing data in the history data file 103 (202), the processor 106 is additionally configured, using data from the database and the vehicle parameter data, to determine if the vehicle 110 will impact terrain or a man-made obstacle within a predetermined time (204). As used herein, the term "impact" is defined as an impact that will result in a loss of power to the vehicle data processing system 100. The predetermined time may vary but is preferably based on design considerations such as, for example, the estimated accuracy of calculation of time to impact, and the time needed to close the history file. Regardless of what the predetermined time is set to, if the processor 106 determines that there is no impact within the predetermined time, the processor 106 continues to store data in the history data file 103.

If, however, the processor 106 determines that the vehicle 110 will experience an impact within the predetermined time, it will stop storing data in the history data file 103 (206). Moreover, at least in the depicted embodiment, the processor 106 is further configured, upon determining that the vehicle will experience an impact within the predetermined time, to close the history data file 103 (208). This ensures that if power is lost as a result of the impact, the history data file 103 is not corrupted.

The system and method described herein prevent vehicle history file corruption in the highly unlikely, yet postulated event of an incident that causes power to a vehicle processing system, such as an aircraft EGPWS, to be lost.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for an aircraft, comprising:
 a non-volatile memory device configured to receive and store aircraft history data in a history data file;
 a database having data stored therein relevant to operation of the aircraft, the data representative of at least terrain or man-made obstacles the aircraft may potentially impact;
 a plurality of aircraft data sources, each aircraft data source configured to supply aircraft vehicle parameter data that are representative of an aircraft parameter; and
 a processor in operable communication with the non-volatile memory device, the database, and the plurality of aircraft data sources, the processor coupled to, and configured to acquire data from, the database, and to receive the aircraft parameter data, the processor configured, upon receipt of the data from the database and the aircraft parameter data, to:
  store at least selected portions of the aircraft parameter data and data representing internally processed parameters in the history data file;
  use the data from the database and the aircraft parameter data, to determine that the aircraft will impact terrain or a man-made obstacle within a predetermined time, wherein the predetermined time is determined based on an estimated accuracy of a calculated time of the impact and a time needed to close the history data file; and
  upon determining that the aircraft will experience an impact within the predetermined time, stop storing data in the history data file and close the history data file within the predetermined time.

2. The system of claim 1, wherein the plurality of aircraft data sources comprise a plurality of aircraft sensors, each aircraft sensor configured to sense one or more different aircraft parameters and supply sensor data representative thereof.

3. The system of claim 1, wherein the aircraft parameters include ground speed, vertical speed, altitude, track, latitude, and longitude.

4. The system of claim 1, wherein the database is a terrain database that includes data representative of at least terrain, man-made obstacles, and airports.

5. The system of claim 1, wherein the processor, the non-volatile memory device, and the database comprise an enhanced ground proximity warning system.

6. A method for storing aircraft history data, comprising the steps of:
 in a processor, retrieving data from a database and receiving aircraft parameter data, the data from the database representative of at least terrain and man-made obstacles the aircraft may potentially impact, the aircraft parameter data representative of aircraft parameters;

storing at least a portion of the aircraft parameter data and data representing internally processed parameters in a aircraft history data file in a non-volatile memory device;

processing, in the processor, the terrain and man-made obstacle data and the aircraft parameter data to determine that the aircraft will experience an impact within a predetermined time, wherein the predetermined time is determined based on an estimated accuracy of a calculated time of the impact and a time needed to close the history data file; and upon determining that the aircraft will experience an impact within the predetermined time, stopping storage of data in the history data file and closing the history data file within the predetermined time.

7. The method of claim 6, wherein the aircraft parameters include ground speed, vertical speed, altitude, track, latitude, and longitude.

8. The method of claim 6, wherein the database is a terrain database that includes at least data representative of terrain, man-made obstacles, and airports.

9. A system for an aircraft, comprising:
a plurality of aircraft data sources, each aircraft data source configured to supply aircraft parameter data that are representative of an aircraft parameter; and
an enhanced ground proximity warning system in operable communication with the plurality of aircraft data sources, the enhanced ground proximity warning system comprising:
a non-volatile memory device configured to receive and store aircraft history data in a flight history data file;
a terrain database having data stored therein that are at least representative of terrain, man-made obstacles, and airports; and
a processor in operable communication with the non-volatile memory device, the terrain database, and the plurality of aircraft data sources, the processor coupled to acquire data from the terrain database and to receive the aircraft parameter data and configured, upon receipt of the data from the database and the aircraft parameter data, to:
store at least selected portions of the aircraft parameter data and data representing internally processed parameters in the flight history data file;
determine that the aircraft will impact terrain or a man-made obstacle within a predetermined time, wherein the predetermined time is determined based on an estimated accuracy of a calculated time of the impact and a time needed to close the history data file; and
upon determining that the aircraft will experience an impact within the predetermined time, stop storing the aircraft parameter data in the flight history data file and close the flight history data file within the predetermined time.

10. The system of claim 9, wherein the plurality of aircraft data sources comprise a plurality of aircraft sensors, each aircraft sensor configured to sense one or more different aircraft parameters and supply sensor data representative thereof.

11. The system of claim 10, wherein the aircraft parameters include ground speed, vertical speed, altitude, track, latitude, and longitude.

* * * * *